United States Patent
Lai et al.

(10) Patent No.: US 10,324,850 B2
(45) Date of Patent: Jun. 18, 2019

(54) SERIAL LOOKUP OF TAG WAYS

(71) Applicant: Microsoft Technology Licensing, LLC, Redmond, WA (US)

(72) Inventors: Patrick P. Lai, Fremont, CA (US); Robert Allen Shearer, Woodinville, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 229 days.

(21) Appl. No.: 15/349,203

(22) Filed: Nov. 11, 2016

(65) Prior Publication Data

US 2018/0137054 A1    May 17, 2018

(51) Int. Cl.
*G06F 12/08* (2016.01)
*G06F 12/0864* (2016.01)
*G06F 12/0831* (2016.01)
*G06F 12/0853* (2016.01)
*G06F 12/0846* (2016.01)

(52) U.S. Cl.
CPC ...... *G06F 12/0864* (2013.01); *G06F 12/0831* (2013.01); *G06F 12/0846* (2013.01); *G06F 12/0853* (2013.01); *G06F 2212/1016* (2013.01); *G06F 2212/621* (2013.01); *Y02D 10/13* (2018.01)

(58) Field of Classification Search
CPC .......................... G06F 12/0831; G06F 12/0853
See application file for complete search history.

(56) References Cited

U.S. PATENT DOCUMENTS

| | | | |
|---|---|---|---|
| 5,276,849 | A | 1/1994 | Patel |
| 5,418,922 | A | 5/1995 | Liu |
| 5,963,978 | A | 10/1999 | Feiste |
| 6,115,792 | A | 9/2000 | Tran |
| 6,275,909 | B1 | 8/2001 | Arimilli et al. |
| 6,687,789 | B1 | 2/2004 | Keller et al. |
| 6,826,656 | B2 | 11/2004 | Augsburg et al. |

(Continued)

FOREIGN PATENT DOCUMENTS

KR   20080067108 A   7/2008

OTHER PUBLICATIONS

Saldanha, et al., "Power Efficient Cache Coherence", Retrieved on: Sep. 7, 2016 Available at: http://pharm.ece.wisc.edu/papers/saldanha_30pages.pdf.

(Continued)

*Primary Examiner* — Ryan Bertram
*Assistant Examiner* — Trang K Ta
(74) *Attorney, Agent, or Firm* — Alleman Hall Creasman & Tuttle LLP

(57) ABSTRACT

A cache system is configurable to trade power consumption for cache access latency. When it is desired for a system with a cache to conserve dynamic power, the lookup of accesses (e.g., snoops) to cache tag ways is serialized to perform one (or less than all) tag way access per clock (or even slower). Thus, for an N-way set associative cache, instead of performing a lookup/comparison on the N tag ways in parallel, the lookups are performed one tag way at a time. This take N times more cycles thereby reducing the access/snoop bandwidth by a factor of N. However, the power consumption of the serialized access when compared to 'all parallel' accesses/snoops is reduced.

16 Claims, 10 Drawing Sheets

(56) References Cited

U.S. PATENT DOCUMENTS

| | | |
|---|---|---|
| 7,143,243 B2 | 11/2006 | Miller |
| 7,937,535 B2 | 5/2011 | Ozer et al. |
| 9,396,117 B2 | 7/2016 | Aggarwal et al. |
| 2002/0083268 A1 | 6/2002 | Arimilli et al. |
| 2005/0050278 A1 | 3/2005 | Meier et al. |
| 2009/0024799 A1* | 1/2009 | Jahagirdar ............ G06F 1/3203 711/130 |
| 2009/0031082 A1 | 1/2009 | Ford et al. |
| 2014/0115264 A1 | 4/2014 | Shirahige |
| 2015/0046658 A1 | 2/2015 | Wilson |
| 2015/0186284 A1* | 7/2015 | Butler ................ G06F 12/0864 711/128 |

OTHER PUBLICATIONS

Bournoutian, et al., "Dynamic, Multi-Core Cache Coherence Architecture for Power-Sensitive Mobile Processors", In Proceedings of the 9th International Conference on Hardware/Software Codesign and System Synthesis, Oct. 9, 2011, pp. 89-97.

Moshovos, et al., "JETTY: Filtering Snoops for Reduced Energy Consumption in SMP Servers", In Proceedings of the 7th International Symposium on High-Performance Computer Architecture, Jan. 20, 2001, 12 pages.

Reinman, et al., "Using a Serial Cache for Energy Efficient Instruction Fetching", In Journal of Systems Architecture, vol. 50, Issue 11, Nov. 30, 2004, pp. 1-21.

Shafiee, et al., "Helia: Heterogeneous Interconnect for Low Resolution Cache Access in snoop-based chip multiprocessors", In Proceedings of IEEE International Conference on Computer Design, Oct. 3, 2010, pp. 84-91.

Zhang, et al., "Reducing dynamic energy of set-associative L1 instruction cache by early tag lookup", In Proceedings of IEEE/ACM International Symposium on Low Power Electronics and Design, Jul. 22, 2015, 6 pages.

"Non Final Office Action Issued in U.S. Appl. No. 15/607,964", dated Jul. 5, 2018, 18 Pages.

Calder, et al., "Predictive Sequential Associative Cache", In Proceedings of the Second International Symposium on High-Performance Computer Architecture, Feb. 3, 1996, 10 Pages.

\* cited by examiner

SERIAL LOOKUP OF TAG WAYS

BACKGROUND

Integrated circuits, and systems-on-a-chip (SoC) may include multiple independent processing units (a.k.a., "cores") that read and execute instructions. These multi-core processing chips typically cooperate to implement multiprocessing. To facilitate this cooperation and to improve performance, multiple levels of cache memories may be used to help bridge the gap between the speed of these processors and main memory.

SUMMARY

Examples discussed herein relate to an apparatus for processing data that includes an N-way set associative cache memory and a cache controller. The N-way set associative cache memory includes a storage array and N tag ways. The storage array is organized into a plurality of cache lines. The tag ways providing an N-way index of storage array locations associated with data blocks stored in the storage array. The cache controller is coupled to the cache memory to respond to cache access requests for data blocks. The cache controller is configurable to perform cache lookups using N-ways in parallel. The cache controller is also configurable to perform cache lookups on the N-ways by serially using sets of M ways in parallel, where M<N.

In another example, a method of operating a cache memory system having a plurality of ways includes configuring the cache memory system to perform tag lookups on all of the plurality of ways concurrently. The method also includes configuring the cache memory system to serially perform, in a first order, tag lookups concurrently on subsets of the plurality of cache ways.

In another example, a method of operating an N-way set associative cache memory system having N tag ways includes, based on the cache memory system being in a first operating mode, looking up data blocks in the N tag ways concurrently. The method also includes, based on the cache memory system being in a second operating mode, sequentially looking up data blocks in subsets of the N tag ways using M tag ways at a time, where M<N.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

In order to describe the manner in which the above-recited and other advantages and features can be obtained, a more particular description is set forth and will be rendered by reference to specific examples thereof which are illustrated in the appended drawings. Understanding that these drawings depict only typical examples and are not therefore to be considered to be limiting of its scope, implementations will be described and explained with additional specificity and detail through the use of the accompanying drawings.

DETAILED DESCRIPTION OF THE EMBODIMENTS

Examples are discussed in detail below. While specific implementations are discussed, it should be understood that this is done for illustration purposes only. A person skilled in the relevant art will recognize that other components and configurations may be used without parting from the spirit and scope of the subject matter of this disclosure. The implementations may be a machine-implemented method, a computing device, an integrated circuit, or a block of an integrated circuit.

When it is desired for a system with a cache to conserve dynamic power, the lookup of accesses (including snoops) to cache tag ways is serialized to perform one (or less than all) tag way access per clock (or even slower). Thus, for a N-way set associative cache, instead of performing lookup/comparison on the N tag ways in parallel, the lookups are performed one tag way a time. This take N times more cycles thereby reducing the access/snoop bandwidth by a factor of N. However, the power consumption of the serialized access when compared to 'all parallel' accesses/snoops is reduced.

As used herein, the term "processor" includes digital logic that executes operational instructions to perform a sequence of tasks. The instructions can be stored in firmware or software, and can represent anywhere from a very limited to a very general instruction set. A processor can be one of several "cores" (a.k.a., 'core processors') that are collocated on a common die or integrated circuit (IC) with other processors. In a multiple processor ("multi-processor") system, individual processors can be the same as or different than other processors, with potentially different performance characteristics (e.g., operating speed, heat dissipation, cache sizes, pin assignments, functional capabilities, and so forth). A set of "asymmetric" or "heterogeneous" processors refers to a set of two or more processors, where at least two processors in the set have different performance capabilities (or benchmark data). A set of "symmetric" or "homogeneous" processors refers to a set of two or more processors, where all of the processors in the set have the same performance capabilities (or benchmark data). As used in the claims below, and in the other parts of this disclosure, the terms "processor", "processor core", and "core processor", or simply "core" will generally be used interchangeably.

Figure 1:
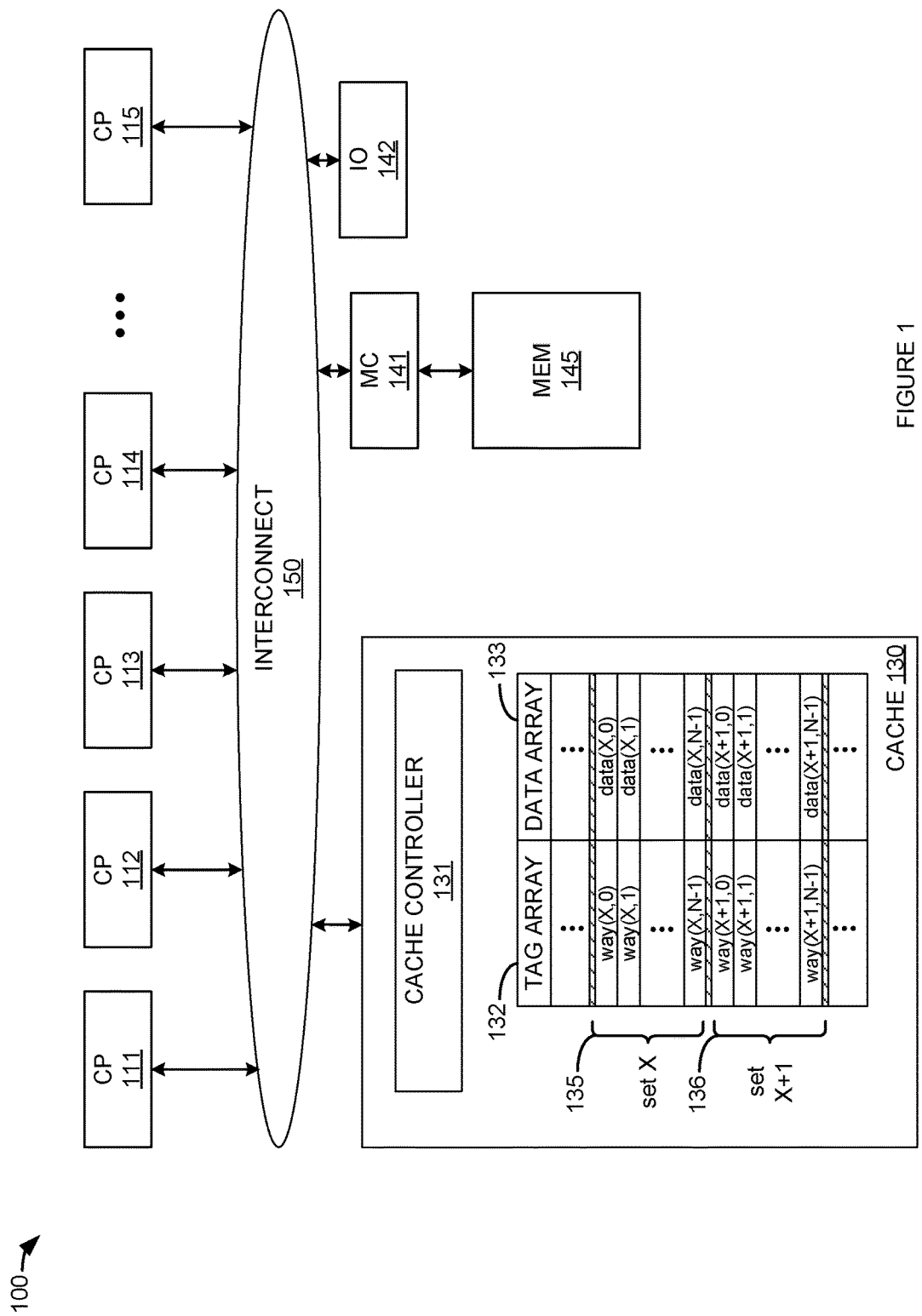
FIG. 1 is a block diagram of a processing system that includes an N-way set associative cache memory and a configurable cache controller.

FIG. 1 is a block diagram of a processing system that includes an N-way set associative cache memory and a configurable cache controller. In FIG. 1, processing system 100 includes core processor (CP) 111, core processor 112, core processor 113, core processor 114, core processor 115, cache 130, interconnect 150, memory controller 141, input/output (IO) processor 142, and main memory 145. Processing system 100 may include additional processors, interfaces, caches, and IO processors (not shown in FIG. 1.)

Core processor 111 is operatively coupled to interconnect 150. Core processor 112 is operatively coupled to interconnect 150. Core processor 113 is operatively coupled to interconnect 150. Core processor 114 is operatively coupled interconnect 150. Core processor 115 is operatively coupled to interconnect 150. Memory controller 141 is operatively coupled to interconnect 150 and to main memory 145. IO processor 142 is operatively coupled to interconnect 150.

Thus, for the example embodiment illustrated in FIG. 1, it should be understood that the elements of processing system 100 are arranged in 'crossbar' interconnect topology. Other network topologies (e.g., mesh, ring, star, hybrid(s), etc.) may be employed by processing system 100.

Interconnect 150 operatively couples processors 111-115, memory controller 141, and IO processor 142 to each other and to cache 130. Thus, data access operations (e.g., load, stores) and cache operations (e.g., snoops, evictions, flushes, etc.), by a processor 111-115, cache 130, memory controller 141, and/or IO processor 142 may be exchanged with each other via interconnect 150.

Cache 130 includes cache controller 131, tag array 132, and data (i.e., cache line) array 133. Tag array 132 and data array 133 are organized into congruence classes (i.e., 'cache ways' or 'ways'.) In FIG. 1, tag array 132 is organized into N number of ways per congruence classes. This is illustrated in FIG. 1 by set X 135 and Set X+1 136 each of which are illustrated with N ways with each way corresponding to a data block (i.e., cache line.) Thus, it should be understood that tag array 132 provides an N-way index of data (storage) array locations that are associated with data blocks (cache lines) stored in the data array.

When an access request (e.g., read, write, snoop, invalidate, etc.), is received, cache controller 131 compares a tag field of the access address to tag values currently stored in a corresponding tag way of the tag array. If a tag match exists, and the tag is valid (i.e., a cache hit), then the cache responds to the access request.

In a first settable configuration, when an address for an access is received by cache 130, cache controller 131 activates and reads, in parallel, all the entries of a tag set 135-136 in the tag array 132 that corresponds to the cache lines that potentially match the address. In other words, all the ways in the addressed tag set 135-136 are activated, read, and at least part of their contents compared to the access address in parallel (i.e., concurrently). In an embodiment, all the addresses in the data array that correspond to the addressed tag set 135-136 are also read in parallel.

In a second settable configuration, when an address for an access is received by cache 130, cache controller 131 activates, reads, and compares the contents of only a single entry of the addressed tag set 135-136 in the tag array 132 at a time. In other words, a first way in the addressed tag set 135-136 is activated, read, and compared to the access address. If this first activated tag entry did not result in a 'hit,' a second way in the addressed tag set 135-136 is then activated, read, and compared. If this second activated tag entry did not result in a 'hit,' a third way in the addressed tag set 135-136 is then activated, read, and compared, and so on. This serial accessing of a single way at a time may be continued until one of the tag entries results in a hit, or all of the (valid) entries in the set have been accessed (i.e., a 'miss'.) In an embodiment, each of the addresses in the data array that correspond to the tag entry being activated are also activated.

In an embodiment, in the second settable configuration, when an address for an access is received by cache 130, cache controller 131 activates, reads, and compares the contents of M number of entries of the addressed tag set 135-136 in the tag array 132 in parallel. In other words, a first M number of ways (where M is less than the total number of ways) in the addressed tag set 135-136 are activated, read, and each compared, in parallel, to the access address. If this first set of activated tag entries does not result in a 'hit,' a second set of M ways in the addressed tag set 135-136 are then activated, read, and each compared, in parallel, to the access address. If this second set of activated tag entries does not result in a 'hit,' a third set of M ways in the addressed tag set 135-136 are then activated, read, and compared, in parallel, and so on. This serial accessing of the M ways at a time may be continued until one of the tag entries results in a hit, or all of the (valid) entries in the set have been accessed (i.e., a 'miss'.) In an embodiment, each of the addresses in the data array that correspond to the M number of tag entries being activated are also activated. It should also be understood that when M=1 (i.e., a subset of one), it is equivalent to accessing each tag way of a set 135-136 one at a time.

In an embodiment, cache controller 131 may vary, from access to access or from set to set, the order that the tag entries within a set are accessed. For example, rather than access way #0 first, way #1 second, way #2 third, etc., cache controller 131 may randomize or regularly change the order the serialized tag accesses take place. By changing the order of the serialized accesses, the number of accesses to each way can be made to be approximately statistically even (i.e., 'wear leveling')—whereas always accessing the ways in a certain order means the first way to be accessed in that order will, statistically, be accessed more than the other tag entries, the second way will be accessed less than the first, but still more than the remaining ways, and so on.

In an embodiment, the order of the serialized tag accesses may be varied according to the type of access request. For example, for access requests associated with processor 111-115 accesses, a first tag/way lookup order (e.g., way #0, then way #1, then way #2, etc.) may be used. For access requests associated with I/O 142 accesses, a second, different from the first, order (e.g., way #N−1, then way #N−2, then way N−3, etc.) may be used.

In an embodiment, whether the tag ways are accessed in parallel versus serially in subsets may be based on the type of access request. For example, for access requests associated with processor 111-115 accesses, all of the tag ways may be accessed in parallel (i.e., the first settable configuration). For access requests associated with I/O 142 accesses, the tag ways may be accessed serially in subsets of M entries at a time, where M≥1.

In an embodiment, cache memory 130 can be configured to perform tag lookups on all of the plurality of ways of a tag set 135-136 concurrently. Cache memory system 130 can also be configured to serially perform, in a first order, tag lookups concurrently on subsets of the plurality of cache ways. These subsets may consist of one cache way of the tag sets 135-136. These subsets may consist of multiple (but less than all) ways of the tag sets 135-136.

In an embodiment, cache memory 130 may stop performing tag lookups on the current tag set 135-136 when a respective tag lookup indicates a corresponding data block is in cache memory 130. In another embodiment, the serially performed tag lookups may proceed until a tag lookup has been performed on all of the plurality of ways—regardless of whether an earlier lookup produced a hit.

Cache memory 130 can also be configured to serially perform, in a second order, tag lookups concurrently on the subsets of the plurality of cache ways where the second order is different from the first order. The first and second orders may be predetermined. The first and second orders may be randomized or pseudo-randomized orders.

Cache memory 130 may associate one of a plurality of memory types with cache access requests. For example, using an access type or the address of the access, cache memory 130 may associate a cache access with processor memory or memory mapped I/O space. Cache memory may be configured to perform tag lookups on all of the plurality of ways of a set 135-136 concurrently based on a first cache access request being associated with a first memory type (e.g., processor memory). Cache memory 130 may also be configured to serially perform tag lookups concurrently on subsets of the plurality of cache ways of a set 135-136 based on a second cache access request being associated with a second memory type (e.g., memory mapped I/O space.)

In an embodiment, the number of ways in the subsets that are concurrently looked-up is based on a power state of cache memory 130. For example, when processing system 100 (and/or cache 130) is in a high-power state, cache memory 130 may activate and read, in parallel, all the entries of a tag set 135-136 for every cache access. When processing system 100 (and/or cache 130) is in a balanced power state, processor 111-115 accesses (e.g., snoops) may access the ways of a set 135-136 in parallel, while I/O accesses (e.g., I/O coherence snoops) may access the ways of a set 135-136 one subset at a time. Other combinations of parallel, subset, or single entry accesses to the ways of a set 135-136 may also be used, for example, to balance power and performance. When processing system 100 (and/or cache 130) is in a low power state, both processor 111-115 accesses (e.g., snoops) and I/O accesses (e.g., I/O coherence snoops) may access the ways of a set 135-136 one subset at a time.

In an embodiment, a power state of the cache memory 130 determines whether the cache memory 130 is to be configured to perform tag lookups on all of the ways of a set 135-136 concurrently, and also determines whether the cache memory 130 is to be configured to serially perform tag lookups concurrently on subsets of the cache ways of a set 135-136. For example, when cache memory 130 is in a first operating mode (e.g., a high-power, high performance mode), data blocks in all N of the tag ways are looked up concurrently. When cache memory 130 is in a second operating mode (e.g., a low-power, low-performance mode), data blocks in subsets of M of the N tag ways (I.e., using M tag ways at a time), where M<N, are sequentially looked up. It should be understood that M=1, M>1, M>2, etc.

For example, the first operating mode may be associated with cache 130 accesses by a compute processor 111-115 and the second operating mode may be associated with cache accesses by an input/output processor 142. In another example, the first operating mode may be associated with a first power state (e.g., a high-power state) of the cache memory 130 and the second operating mode may be associated with a second power state (e.g., a low-power state) of the cache memory system. In addition, during (or in response to) the second power state, the sequential order that sets of the M tag ways are used to look up data blocks may be varied.

Thus, it should be understood that to access cache 130, which is an N-way set associative cache, there are N number of tag accesses and comparisons to perform (e.g., for a snoop access). These lookups are configurable to be performed in either a serial manner (e.g., 1 access and comparison per clock or tag way access cycle) in order to save power, or a parallel manner. These lookups can be configured to be performed serially for non-latency sensitive accesses like snoop accesses for I/O coherent transactions. These lookups can also be configured to be performed in parallel for latency sensitive accesses like processor snoops. Other mixes of serial and parallel accesses may also be configured in order to dynamically balance access (e.g., snoop) bandwidth and latency versus power consumption.

FIGS. 2A-2E are diagrams that illustrate concurrent accesses to a plurality of cache tag ways. In FIGS. 2A-2E cache 230 comprises cache controller 231 and tag array 232. Tag array 232 is organized into at least one associative set X 235. In FIGS. 2A-2F, associative set X is illustrated with four (4) ways—way0, way1, way2, and way3.

Figure 2A:
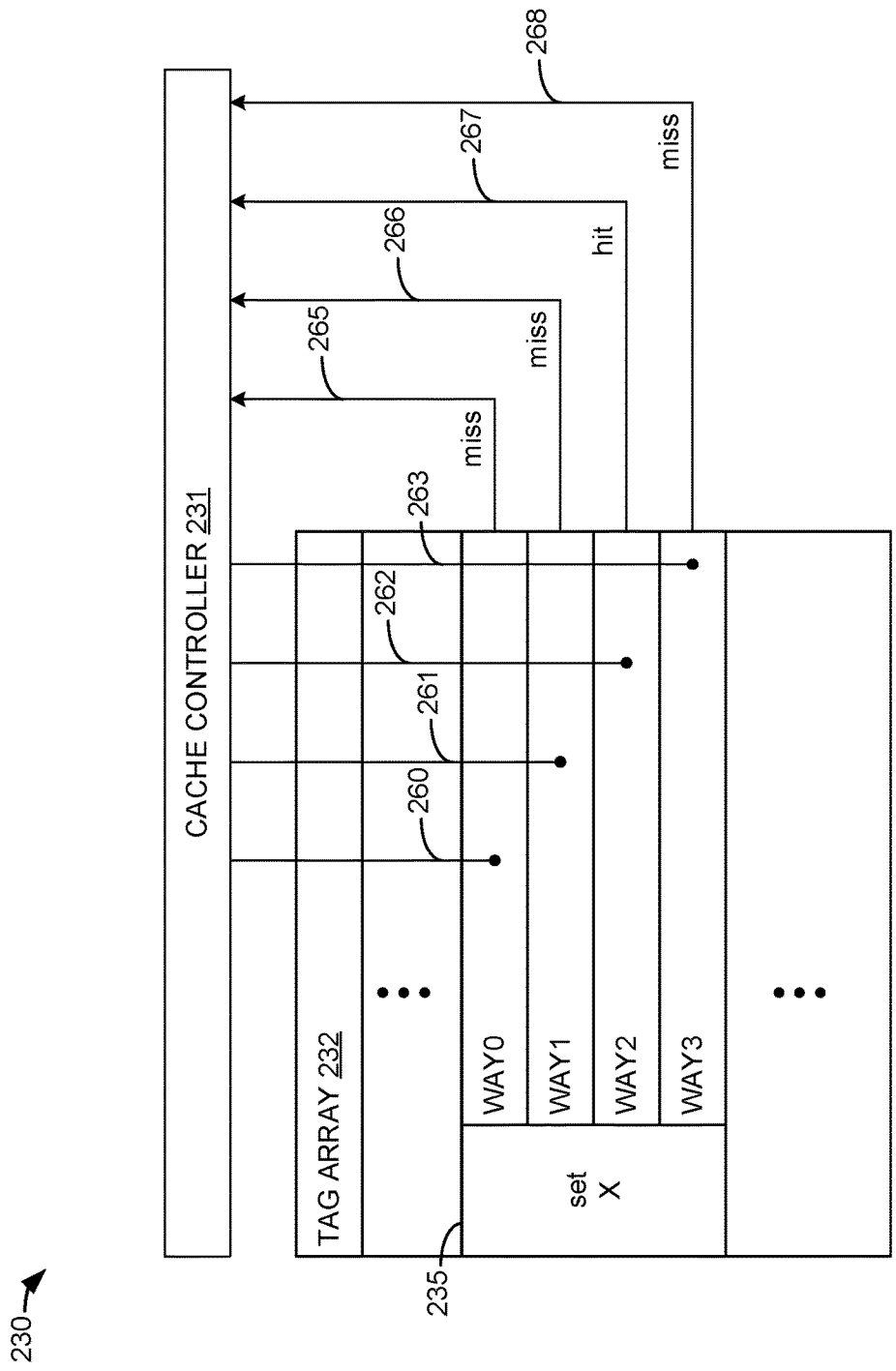
FIGS. 2A-2E are diagrams that illustrate concurrent accesses to a plurality of cache tag ways.

FIG. 2A illustrates a parallel access to all of the ways of set X. In FIG. 2A, cache controller 231 activates and reads all the ways of set X in parallel. This is illustrated in FIG. 2A by lines 260-263. The results of the parallel access to all the ways of set X are provided to cache controller 231. This is illustrated in FIG. 2A by arrows 265-268. Also illustrated in FIG. 2A is that the way2 entry of set X resulted in a 'hit' and the other ways in set X were 'misses.' This is illustrated in FIG. 2A by the 'hit' label on arrow 267 (which runs from way2 to cache controller 231) and the 'miss' labels on arrows 265, 266, and 268 (which run from way0, way1, and way3, respectively, to cache controller 231.)

Figure 2B:
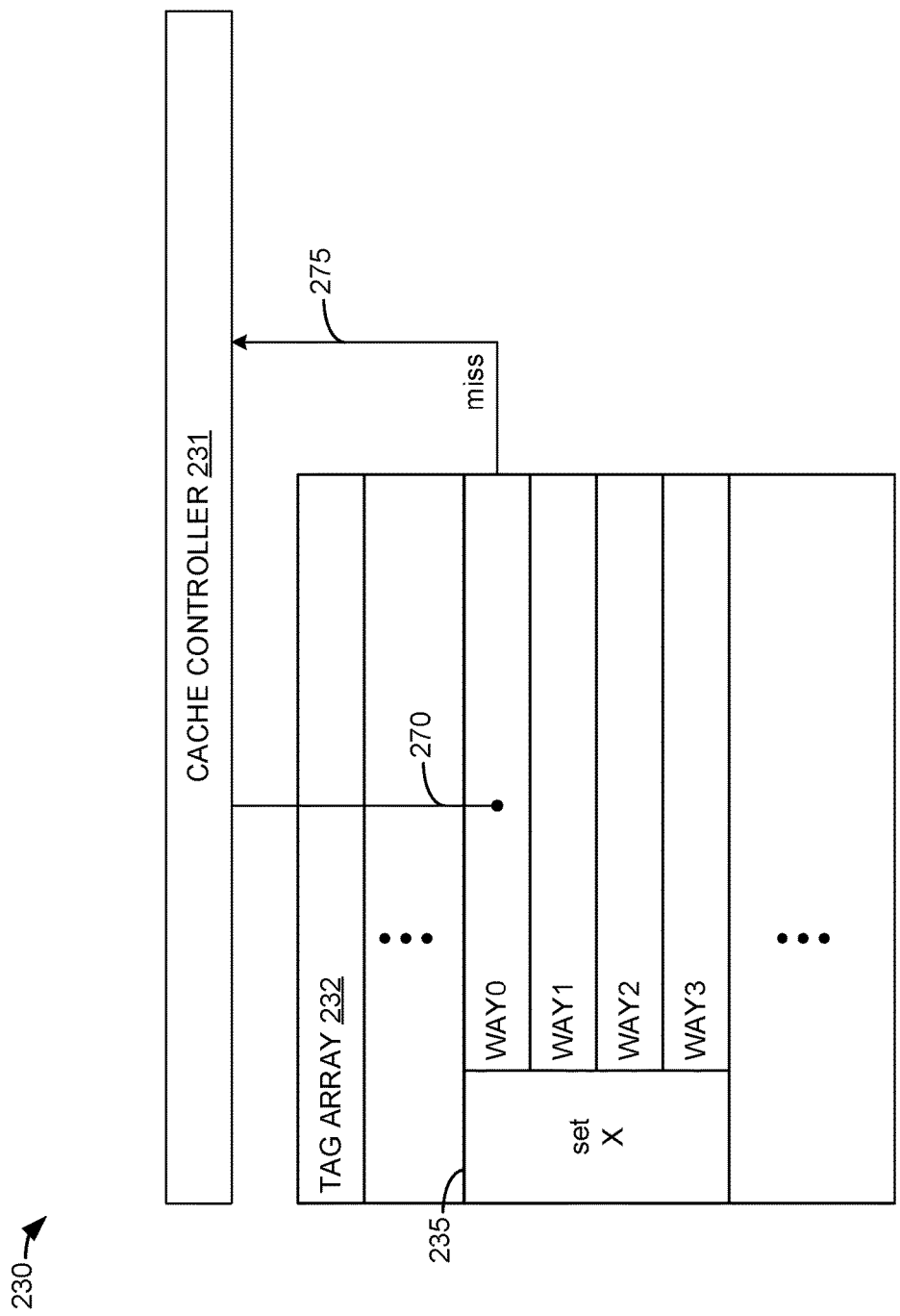

FIG. 2B illustrates a first serialized access to a first way of set X. In FIG. 2B, cache controller 231 activates and reads only a single way of set X. This is illustrated in FIG. 2B by line 270. The results of this first access to the first way of set X is provided to cache controller 231. This is illustrated in FIG. 2B by arrow 275. Also illustrated in FIG. 2B is that the access to the way0 entry of set X resulted in a 'miss.' This is illustrated in FIG. 2B by the 'miss' label on arrow 275 (which runs from way0 to cache controller 231.)

Figure 2C:
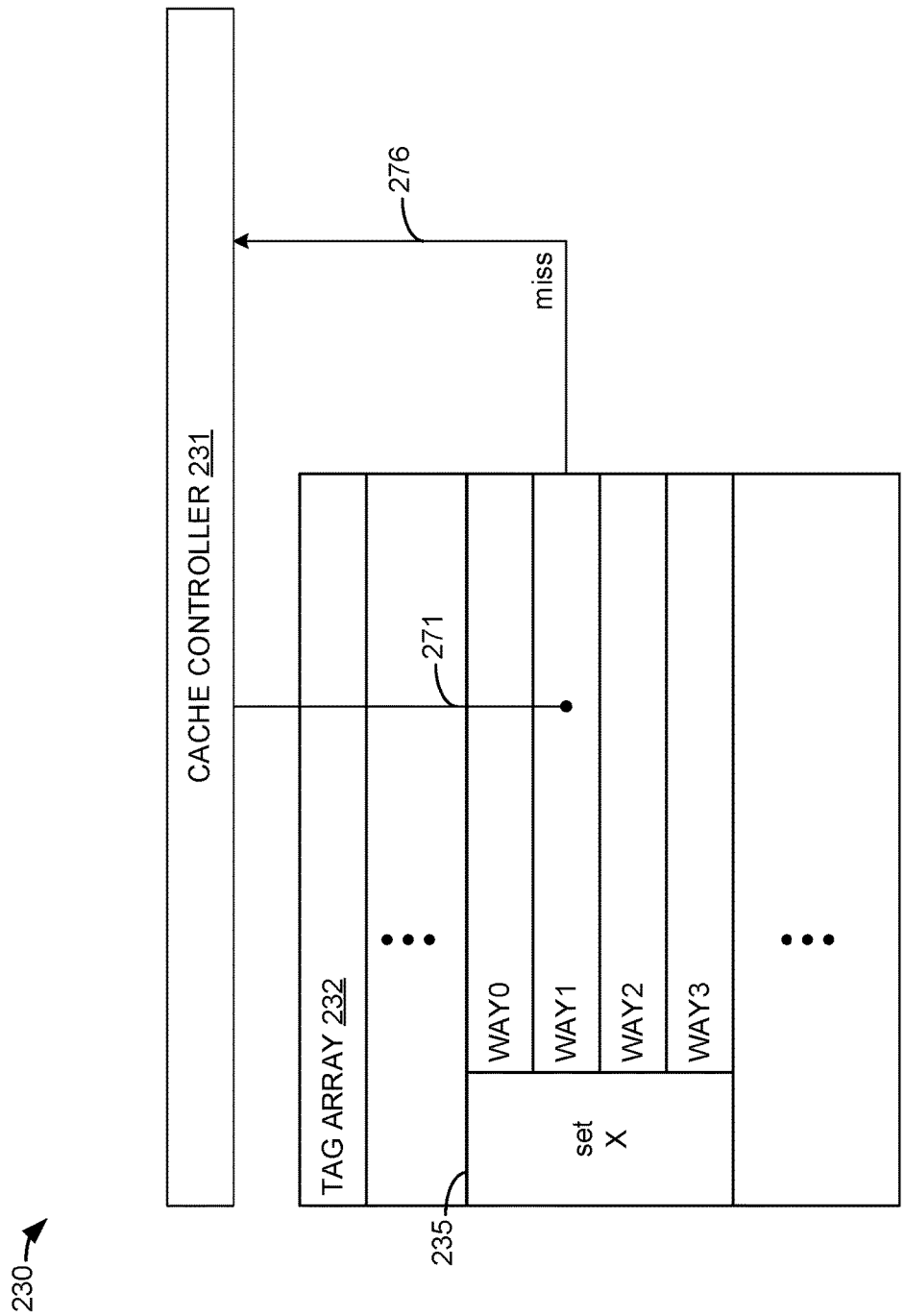

FIG. 2C illustrates a second (after the access of FIG. 2B) serialized access to a second way of set X. In FIG. 2C, cache controller 231 activates and reads only a single way of set X. This is illustrated in FIG. 2C by line 271. The results of this second access to the second way of set X is provided to cache controller 231. This is illustrated in FIG. 2C by arrow 276. Also illustrated in FIG. 2C is that the access to the way1 entry of set X resulted in a 'miss.' This is illustrated in FIG. 2C by the 'miss' label on arrow 276 (which runs from way1 to cache controller 231.)

Figure 2D:
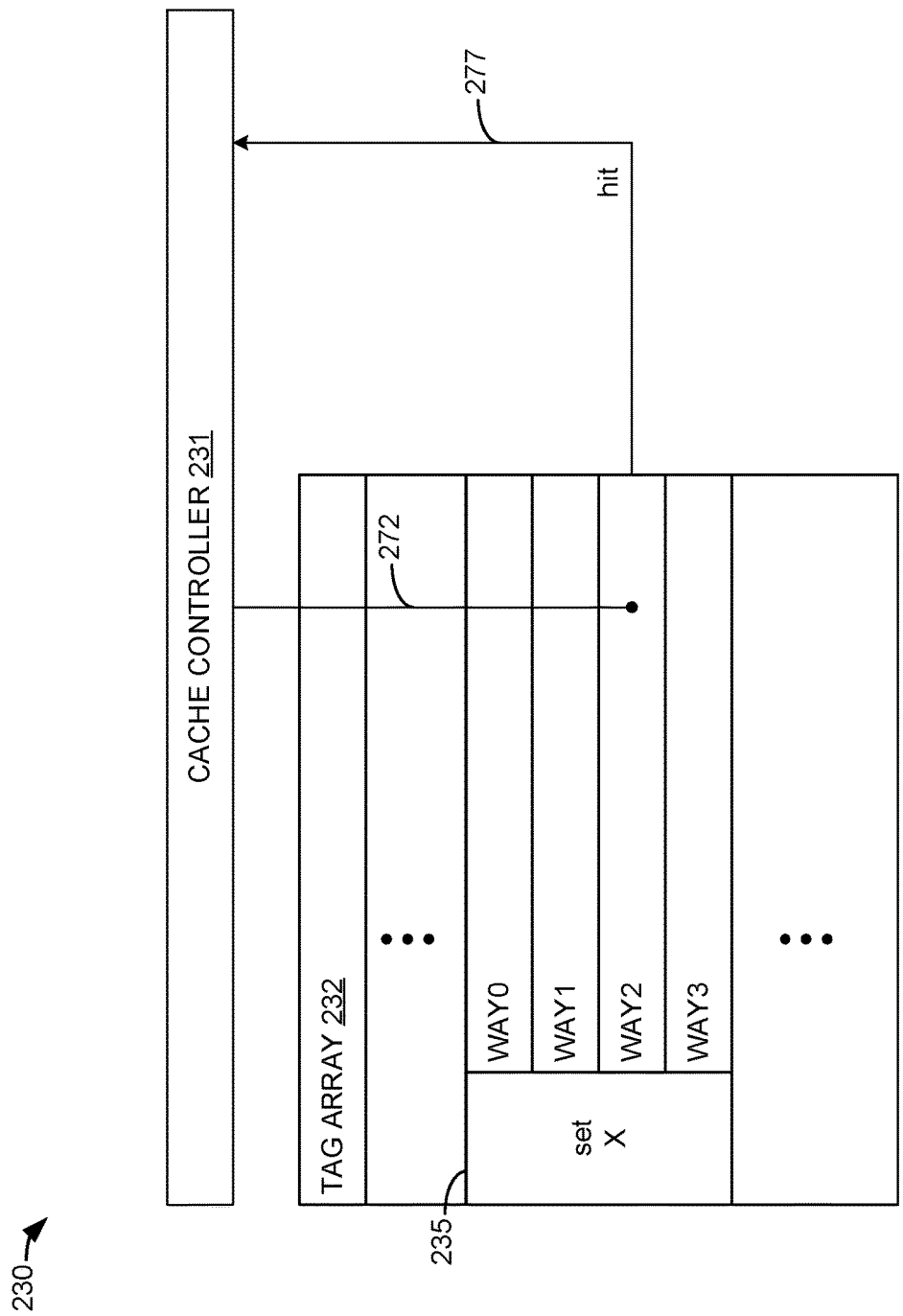

FIG. 2D illustrates a third (after the accesses of FIGS. 2A and 2B) serialized access to a third way of set X. In FIG. 2D, cache controller 231 activates and reads only a single way of set X. This is illustrated in FIG. 2D by line 272. The results of this third access to the third way of set X is provided to cache controller 231. This is illustrated in FIG. 2D by arrow 277. Also illustrated in FIG. 2D is that the access to the way2 entry of set X resulted in a 'hit.' This is illustrated in FIG. 2D by the 'hit' label on arrow 276 (which runs from way2 to cache controller 231.) Since this third serialized access resulted in a hit, cache controller 231 may forego accessing way3. In this manner, at least the power associated with accessing way3 is saved.

Figure 2E:
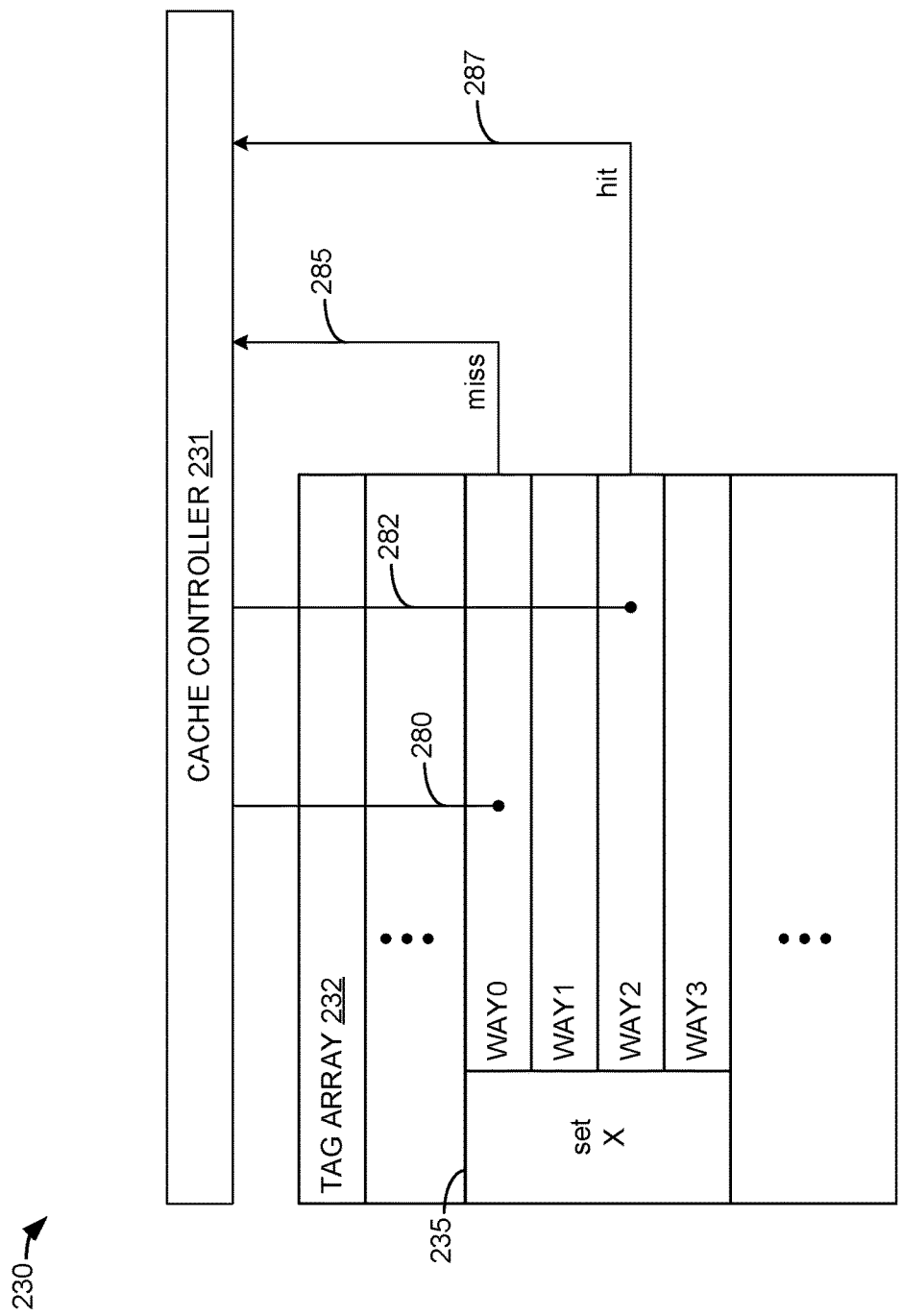

FIG. 2E illustrates serialized access to a multi-way subset of set X. In FIG. 2E, cache controller 231 activates and reads two of the ways (way0 and way2) of set X concurrently. This is illustrated in FIG. 2E by lines 280 and 282. The results of these two parallel accesses to the two ways of set X are provided to cache controller 231. This is illustrated in FIG. 2E by arrows 285 and 287. Also illustrated in FIG. 2E is that the access to the way0 entry of set X resulted in a 'miss' but the access to the way2 entry of set X resulted in a 'hit.' This is illustrated in FIG. 2E by the 'miss' label on arrow 285 (which runs from way0 to cache controller 231) and the 'hit' label on arrow 287 (which runs from way2 to cache controller 231.) Since this access to a multi-way subset of set X resulted in a hit, cache controller 231 may forego accessing way1 and way 3. In this manner, the power associated with accessing at least way1 and way3 is saved.

Figure 3:
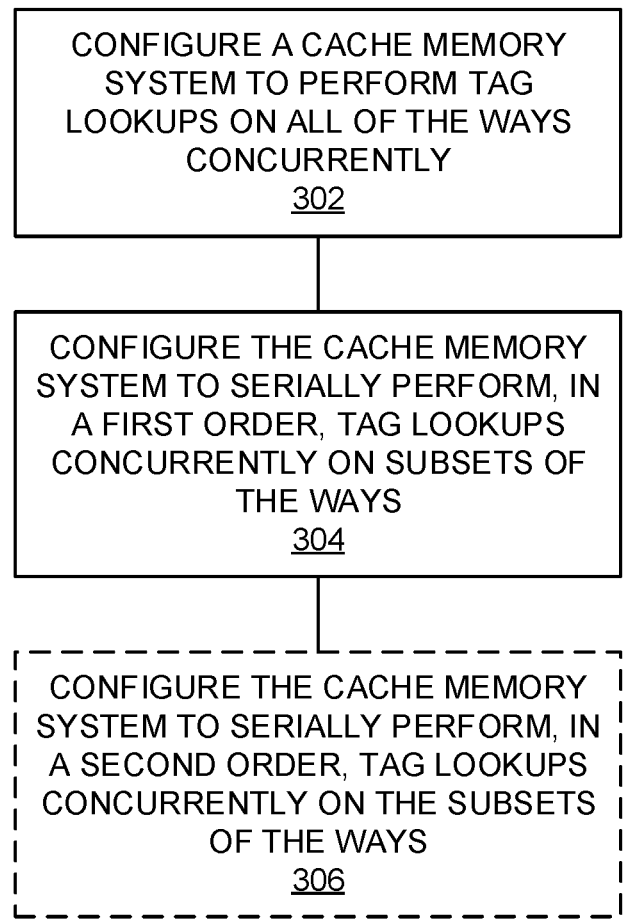
FIG. 3 is a flowchart illustrating a method of operating a cache with multiple tag ways.

FIG. 3 is a flowchart illustrating a method of operating a cache with multiple tag ways. The steps illustrated in FIG. 3 may be performed, for example, by one or more elements of processing system 100, cache 230, and/or their components. A cache memory system is configured to perform tag lookups on all of the ways concurrently (302). For example, cache 130 may be configured to perform tag lookups on all the entries (i.e., way(X,0), way(X,1) . . . way(X,N-1)) of set X 135 concurrently.

The cache memory is configured to serially perform, in a first order, tag lookups concurrently on subsets of the ways (304). For example, cache 130 may be configured to perform tag lookups on subsets (e.g., one way, two ways, three ways, etc.) of the entries of set X 135 concurrently with these subsets being accessed in a first order. For example, cache 130 may first perform tag lookups on way(X,0) and way(X,1) concurrently. If this does not result in a hit, cache 130 may then perform tag lookups on way(X,2) and way(X,3) concurrently. If this does not result in a hit, cache 130 may then perform tag lookups on way(X,4) and way(X,5) concurrently, and so on.

Optionally, the cache memory can be configured to serially perform, in a second order, tag lookups concurrently on subsets of the ways. For example, cache 130 may be configured to perform tag lookups on subsets (e.g., one way, two ways, three ways, etc.) of the entries of set X 135 concurrently, with these subsets being accessed in a second order that is different from the first order. For example, cache 130 may first perform tag lookups on way(X,N-1) and way(X,N-2) concurrently. If this does not result in a hit, cache 130 may perform tag lookups on way(X,N-3) and way(X,N-4) concurrently. If this does not result in a hit, cache 130 may perform tag lookups on way(X,N-5) and way(X,N-6) concurrently, and so on.

Figure 4:
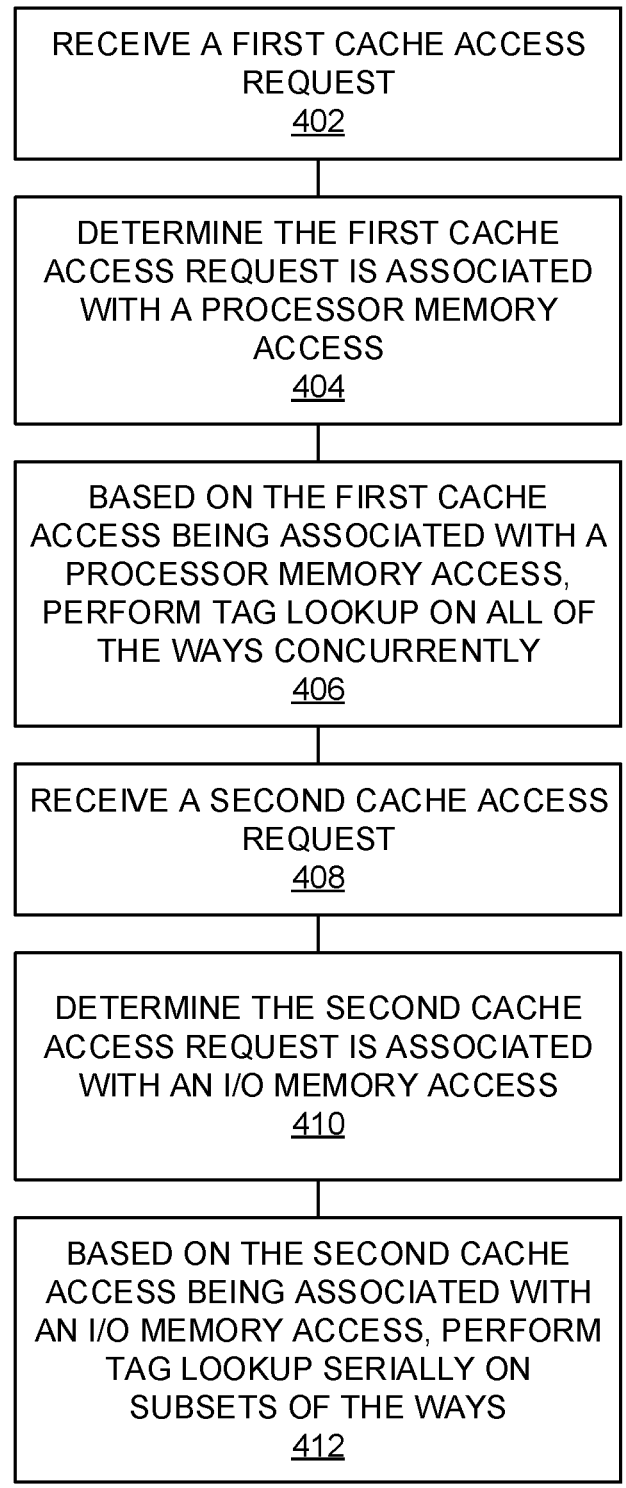
FIG. 4 is a flowchart illustrating a method of determining whether to access cache tags concurrently or serially.

FIG. 4 is a flowchart illustrating a method of determining whether to access cache tags concurrently or serially. The steps illustrated in FIG. 3 may be performed, for example, by one or more elements of processing system 100, cache 230, and/or their components. A first cache access request is received (402). For example, cache 130 may receive, from processor 111, a snoop transaction. Processor 111 may have sent this snoop transaction to cache 130 to determine whether cache 130 holds a copy of a particular cache line.

The first cache access request is determined to be associated with a processor memory access (404). For example, cache 130 may determine, based on the source of the snoop transaction, that the transaction is from a processor 111-115 (and/or processor 111, in particular.) In another example, cache 130 may determine, based on the address of the snoop transaction (e.g., processor memory space vs. I/O memory space), that the snoop transaction is associated with a processor transaction.

Based on the first cache access being associated with a processor memory access, a tag lookup is performed on all of the ways concurrently (406). For example, cache 130 may, based on the determination that a snoop transaction is from a processor 111-115, perform a tag lookup on all of the ways of set X 135 concurrently.

A second cache access request is received (408). For example, cache 130 may receive, from I/O 142, a snoop transaction. I/O 142 may have sent this snoop transaction to cache 130 to determine whether cache 130 holds a copy of a particular cache line. I/O 142 may have sent this snoop transaction to cache 130 to cause cache 130 to, for example, invalidate a copy of a particular cache line.

The second cache access request is determined to be associated with an I/O memory access (410). For example, cache 130 may determine, based on the source of the snoop transaction, that the transaction is from I/O 142. In another example, cache 130 may determine, based on the address of the snoop transaction (e.g., processor memory space vs. I/O memory space), that the snoop transaction is associated with an I/O memory space transaction.

Based on the second cache access being associated with an I/O memory access, a tag lookup is performed serially on subsets of the ways concurrently (412). For example, cache 130 may, based on the determination that a snoop transaction is from I/O 142, first perform a tag lookup on way(X,0) of set X 135, then perform a tag lookup on way(X,1) of set X 135, then perform a tag lookup on way(X,2) of set X 135, and so on until either all of the tag ways have been checked or a hit is found.

Figure 5:
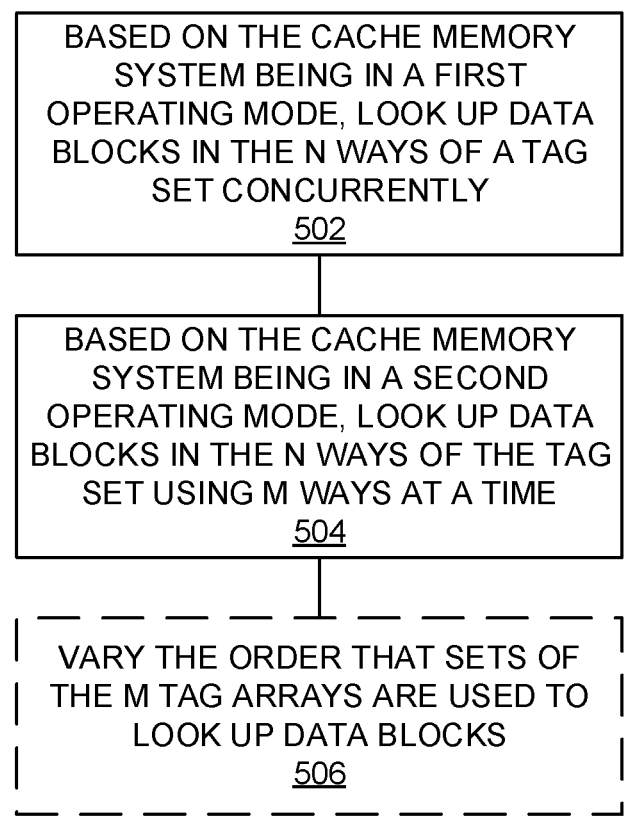
FIG. 5 is a flowchart illustrating a method of configuring cache tag accesses.
Figure 6:
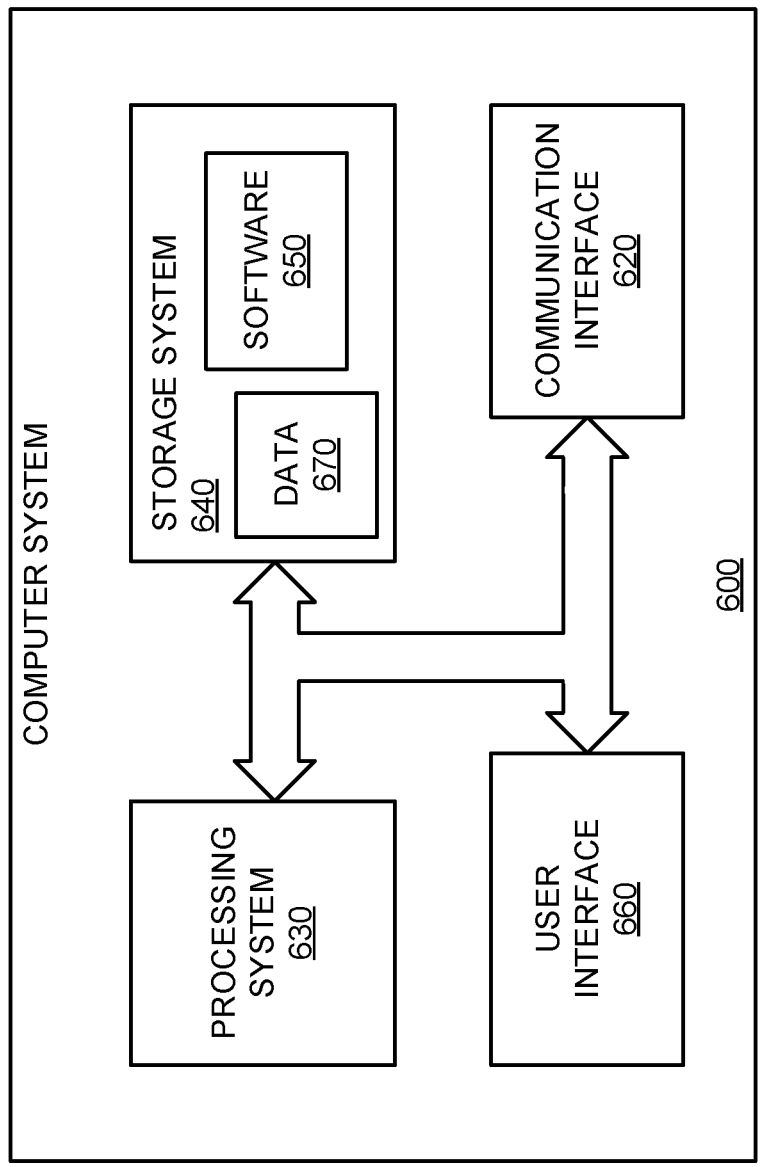
FIG. 6 is a block diagram illustrating a computer system.

FIG. 5 is a flowchart illustrating a method of configuring cache tag accesses. The steps illustrated in FIG. 5 may be performed, for example, by one or more elements of processing system 100, cache 230, and/or their components. Based on the cache memory system being in a first operating mode, data blocks are looked up in the N ways of a tag set concurrently (502). For example, based on cache 130 being in a high-power operating mode, cache 130 may look up cache lines in set X 135 by accessing way(X,0) to way(X,N-1) concurrently.

Based on the cache memory being is a second operating mode, data blocks are looked up in the N ways of the tag set using M ways at a time (504). For example, based on cache 130 being in a lower-power operating mode, cache 130 may look up cache lines in set X 135 by first accessing way(X,0), then accessing way(X,1), then accessing way (X,2), and so on until all N ways have been accessed or a hit has been detected. In another example, based on cache 130 being in a lower-power operating mode, cache 130 may look up cache lines in set X 135 by first accessing way(X,0) and way(X,N-1) concurrently, then accessing way(X,1), then accessing way (X,N-2) concurrently, and so on until all N ways have been accessed or a hit has been detected.

Optionally, the order that sets of the M tag ways are used to look up data blocks is varied (506). For example, the first time cache 130 looks up a cache line in set X 135, cache 130 may start with a first access to way(X,0), then an access way(X,1), then an access way (X,2), and so on until all N ways have been accessed or a hit has been detected. The second time cache 130 looks up a cache line in set X 135, cache 130 may start with a first access to way(X,1), then an access way(X,2), then an access way (X,3), and then after way(X,N-1) is accessed, cache 130 may wrap-around and access way(X,0). Thus, although the serial order of these access has changed, either all N ways will be accessed and checked for a hit, or a hit will have been detected.

In another example, the first time cache 130 looks up a cache line in set X 135, cache 130 may start with tag lookups on way(X,N-1) and way(X,N-2) concurrently. If this does not result in a hit, cache 130 may then perform tag lookups on way(X,N-3) and way(X,N-4) concurrently. If this does not result in a hit, cache 130 may perform tag lookups on way(X,N-5) and way(X,N-6) concurrently, and so on. The second time cache 130 looks up a cache line in set X 135, cache 130 may start may with tag lookups on way(X,1) and way(X,2) concurrently. If this does not result in a hit, cache 130 may then perform tag lookups on way(X,3) and way (X,4) concurrently. If this does not result in a hit, cache 130 may perform tag lookups on way(X,5) and way(X,6) concurrently, and so on.

The methods, systems and devices described herein may be implemented in computer systems, or stored by computer systems. The methods described above may also be stored on a non-transitory computer readable medium. Devices, circuits, and systems described herein may be implemented using computer-aided design tools available in the art, and embodied by computer-readable files containing software descriptions of such circuits. This includes, but is not limited to one or more elements of processing system 100, and/or cache 230, and their components. These software descriptions may be: behavioral, register transfer, logic component, transistor, and layout geometry-level descriptions.

Data formats in which such descriptions may be implemented are stored on a non-transitory computer readable medium include, but are not limited to: formats supporting behavioral languages like C, formats supporting register transfer level (RTL) languages like Verilog and VHDL, formats supporting geometry description languages (such as GDSII, GDSIII, GDSIV, CIF, and MEBES), and other suitable formats and languages. Physical files may be implemented on non-transitory machine-readable media such as: 4 mm magnetic tape, 8 mm magnetic tape, 3½-inch floppy media, CDs, DVDs, hard disk drives, solid-state disk drives, solid-state memory, flash drives, and so on.

Alternatively, or in addition, the functionally described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), multi-core processors, graphics processing units (GPUs), etc.

Computer system 600 includes communication interface 620, processing system 630, storage system 640, and user interface 660. Processing system 630 is operatively coupled to storage system 640. Storage system 640 stores software 650 and data 670. Processing system 630 is operatively coupled to communication interface 620 and user interface 660. Processing system 630 may be an example of one or more of integrated circuit 100, processors 111-115, I/O 142, and/or their components.

Computer system 600 may comprise a programmed general-purpose computer. Computer system 600 may include a microprocessor. Computer system 600 may comprise programmable or special purpose circuitry. Computer system 600 may be distributed among multiple devices, processors, storage, and/or interfaces that together comprise elements 620-670.

Communication interface 620 may comprise a network interface, modem, port, bus, link, transceiver, or other communication device. Communication interface 620 may be distributed among multiple communication devices. Processing system 630 may comprise a microprocessor, microcontroller, logic circuit, or other processing device. Processing system 630 may be distributed among multiple processing devices. Optional user interface 660 may comprise a keyboard, mouse, voice recognition interface, microphone and speakers, graphical display, touch screen, or other type of user interface device. User interface 660 may be distributed among multiple interface devices. Storage system 640 may comprise a disk, tape, integrated circuit, RAM, ROM, EEPROM, flash memory, network storage, server, or other memory function. Storage system 640 may include computer readable medium. Storage system 640 may be distributed among multiple memory devices.

Processing system 630 retrieves and executes software 650 from storage system 640. Processing system 630 may retrieve and store data 670. Processing system 630 may also retrieve and store data via communication interface 620. Processing system 650 may create or modify software 650 or data 670 to achieve a tangible result. Processing system may control communication interface 620 or user interface 660 to achieve a tangible result. Processing system 630 may retrieve and execute remotely stored software via communication interface 620.

Software 650 and remotely stored software may comprise an operating system, utilities, drivers, networking software, and other software typically executed by a computer system. Software 650 may comprise an application program, applet, firmware, or other form of machine-readable processing instructions typically executed by a computer system. When executed by processing system 630, software 650 or remotely stored software may direct computer system 600 to operate as described herein.

Implementations discussed herein include, but are not limited to, the following examples:

Example 1

An apparatus for processing data, comprising: an N-way set associative cache memory comprising a storage array and N tag ways, the storage array organized into a plurality of cache lines, the tag ways providing an N-way index of storage array locations associated with data blocks stored in the storage array; and, a cache controller coupled to the cache memory to respond to cache access requests for data blocks, the cache controller configurable to perform cache lookups using N-ways in parallel, the cache controller also being configurable to perform cache lookups on the N-ways by serially using sets of M ways in parallel, where M<N.

Example 2

The apparatus of example 1, wherein M=1.

Example 3

The apparatus of example 1, wherein if a cache lookup for a requested data block that was performed on a set of M ways in parallel indicates the requested data block is present in the storage array, and there are remaining ways that have not been used to lookup the requested data block, the remaining ways are not used to lookup the requested data block.

Example 4

The apparatus of example 1, wherein the sets of M ways are used in a first serial order for a first cache access request and a second serial order for a second cache access request.

Example 5

The apparatus of example 1, wherein a first type of cache access request is performed using the N-ways in parallel and a second type of cache access request is performed serially using set of M way in parallel.

Example 6

The apparatus of example 5, wherein the first type of access request is associated with processor accesses and the second type of access request is associated with input/output (I/O) accesses.

Example 7

The apparatus of example 6, wherein the cache access requests include snoop requests.

Example 8

A method of operating a cache memory system having a plurality of ways, comprising: configuring the cache memory system to perform tag lookups on all of the plurality of ways concurrently; and, configuring the cache memory system to serially perform, in a first order, tag lookups concurrently on subsets of the plurality of cache ways.

Example 9

The method of example 8, wherein the subsets consist of one cache way of the plurality of cache ways.

Example 10

The method of example 8, wherein the serially performed tag lookups are stopped when a respective tag lookup indicates a corresponding data block is in the cache memory system.

Example 11

The method of example 10, wherein the serially performed tag lookups proceed until a tag lookup has been performed on all of the plurality of ways.

Example 12

The method of example 8, further comprising: configuring the cache memory system to serially perform, in a second order, tag lookups concurrently on the subsets of the plurality of cache ways, the second order being different from the first order.

Example 13

The method of example 8, further comprising: associating one of a plurality of memory types with cache access requests, wherein the cache memory system is configured to perform tag lookups on all of the plurality of ways concurrently based on a first cache access request being associated with a first memory type, and the cache memory system is configured to serially perform tag lookups concurrently on subsets of the plurality of cache ways based on a second cache access request being associated with a second memory type.

Example 14

The method of example 8, wherein a number of ways in the subsets of the plurality of cache ways that are concurrently looked-up is based on a power state of the cache memory system.

Example 15

The method of example 8, wherein a power state of the cache memory system determines whether the cache memory system is to be configured to perform tag lookups on all of the plurality of ways concurrently and determines whether the cache memory system is to be configured to serially perform tag lookups concurrently on subsets of the plurality of cache ways.

Example 16

A method of operating an N-way set associative cache memory system having N tag ways, comprising: based on the cache memory system being in a first operating mode, looking up data blocks in the N tag ways concurrently; based on the cache memory system being in a second operating mode, sequentially looking up data blocks in subsets of the N tag ways using M tag ways at a time, where M<N.

Example 17

The method of example 16, wherein M>1.

Example 18

The method of example 16, wherein the first operating mode is associated with cache accesses by a compute processor and the second operating mode is associated with cache accesses by an input/output processor.

Example 19

The method of example 16 wherein the first operating mode is associated with a first power state of the cache memory system and the second operating mode is associated with a second power state of the cache memory system.

Example 20

The method of example 16, further comprising: varying a sequential order that sets of the M tag ways are used to look up data blocks.

The foregoing descriptions of the disclosed embodiments have been presented for purposes of illustration and description. They are not intended to be exhaustive or to limit the scope of the claimed subject matter to the precise form(s) disclosed, and other modifications and variations may be possible in light of the above teachings. The embodiments were chosen and described in order to best explain the principles of the disclosed embodiments and their practical application to thereby enable others skilled in the art to best utilize the various embodiments and various modifications as are suited to the particular use contemplated. It is intended that the appended claims be construed to include other alternative embodiments except insofar as limited by the prior art.

What is claimed is:

1. An apparatus for processing data, comprising:
an N-way set associative cache memory comprising a storage array and N tag ways, the storage array organized into a plurality of cache lines, the tag ways providing an N-way index of storage array locations associated with data blocks stored in the storage array; and,
a cache controller coupled to the cache memory to respond to cache access requests for data blocks, the cache controller configurable to perform cache lookups using N-ways in parallel for a first cache access request associated with a first memory type, the cache controller also being configurable to perform cache lookups on the N-ways by serially using sets of M ways in parallel for a second cache access request associated with a second memory type, where M<N.

2. The apparatus of claim 1, wherein M=1.

3. The apparatus of claim 1, wherein if a cache lookup for a requested data block that was performed on a set of M ways in parallel indicates the requested data block is present in the storage array, and there are remaining ways that have not been used to lookup the requested data block, the remaining ways are not used to lookup the requested data block.

4. The apparatus of claim 1, wherein the sets of M ways are used in a first serial order for the second cache access request and a second serial order for a third cache access request.

5. The apparatus of claim 1, wherein the first cache access request belongs to a first type of cache access request performed using the N-ways in parallel and the second cache access request belongs to a second type of cache access request performed serially using set of M way in parallel.

6. The apparatus of claim 5, wherein the first type of access request is associated with processor memory accesses and the second type of access request is associated with memory-mapped input/output (I/O) space accesses.

7. The apparatus of claim 6, wherein the cache access requests include snoop requests.

8. A method of operating a cache memory system having a plurality of ways, comprising:
configuring the cache memory system to perform tag lookups associated with a first memory type on all of the plurality of ways concurrently; and,
configuring the cache memory system to serially perform, in a first order, tag lookups associated with a second memory type concurrently on subsets of the plurality of cache ways.

9. The method of claim 8, wherein the subsets consist of one cache way of the plurality of cache ways.

10. The method of claim 8, wherein the serially performed tag lookups are stopped when a respective tag lookup indicates a corresponding data block is in the cache memory system.

11. The method of claim 10, wherein the serially performed tag lookups proceed until a tag lookup has been performed on all of the plurality of ways.

12. The method of claim 8, further comprising:
configuring the cache memory system to serially perform, in a second order, tag lookups concurrently on the subsets of the plurality of cache ways, the second order being different from the first order.

13. The method of claim 8, wherein a number of ways in the subsets of the plurality of cache ways that are concurrently looked-up is based on a power state of the cache memory system.

14. A method of operating an N-way set associative cache memory system having N tag ways, comprising:
looking up, via a first cache access request, data blocks held in processor memory in the N tag ways concurrently in a parallel manner; and,
sequentially looking up, via a second cache access request, data blocks held in memory-mapped input/output (I/O) space in subsets of the N tag ways using M tag ways in parallel at a time, where M<N, said sequential lookup being performed in a serial manner.

15. The method of claim 14, wherein M>1.

16. The method of claim 14, further comprising:
varying a sequential order that sets of the M tag ways are used to look up data blocks.

\* \* \* \* \*